May 10, 1927.

Re. 16,618

J. B. KEMP

PAD HOLDER

Original Filed Feb. 26, 1924 2 Sheets-Sheet 1

John B. Kemp INVENTOR.
BY Scheckter & Lotsch
his ATTORNEYS.

May 10, 1927.

J. B. KEMP

Re. 16,618

PAD HOLDER

Original Filed Feb. 26, 1924 2 Sheets-Sheet 2

John B. Kemp INVENTOR.

BY Schuchte & Lotch

ATTORNEYS.

Reissued May 10, 1927.

Re. 16,618

UNITED STATES PATENT OFFICE.

JOHN B. KEMP, OF RIDGEWOOD, NEW JERSEY, ASSIGNOR TO CLARK LOOSE LEAF MANUFACTURING COMPANY, A CORPORATION OF NEW YORK.

PAD HOLDER.

Original No. 1,534,124, dated April 21, 1925, Serial No. 695,217, filed February 26, 1924. Application for reissue filed March 17, 1927. Serial No. 176,269.

My invention relates generally to a holder adapted to retain a calendar, writing or other memorandum pad in position, and more particularly to an arrangement for holding a group of superposed members in proper relation and in angular position with reference to a supporting surface.

In various forms of calendars where a daily pad is attached thereto and where it is desired to have means so that the pad can be quickly replaced by a new pad or to check up the slack between the leaves to hold the remaining portions firmly in place, it is most desirable to have means which are quickly and easily adjustable, and it is one of the objects of my invention to provide means which will permit one to easily and quickly adjust the pad. I have also found that the old style pad which lies flat on the desk is objectionable and that it is very desirable to have the pad in an inclined angular position, and it is one of the objects of this invention to provide such means to hold the pad in an inclined position.

Another object of my invention is the construction of a device of the character described, comprising a group of superposed members having means adjacent one edge thereof for maintaining them in superposed relationship and angularly with reference to a supporting surface.

Another object of my invention is the production of a pad in which a top plate is adapted to be utilized as a supporting means for the pad, as a cutting device for the purpose of cutting or severing the leaves of the pad, and for advertising purposes.

Another object of my invention is to make a pad which is simple, compact, inexpensive and attractive in appearance.

Another object of my invention is the production of a device which will facilitate the removal and replacement of the leaves of the pad.

Another object is to produce a device of the character described in which the maximum simplicity of construction and operation is secured.

Other objects and advantages will appear as the nature of the improvements is better understood, the invention consisting substantially in the novel arrangement and co-relation of instrumentalities herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive, standpoint.

The inventive idea involved is capable of receiving a variety of mechanical expressions, one of which, for the purposes of illustration, is shown in the accompanying drawings, in which—

Figure 1:
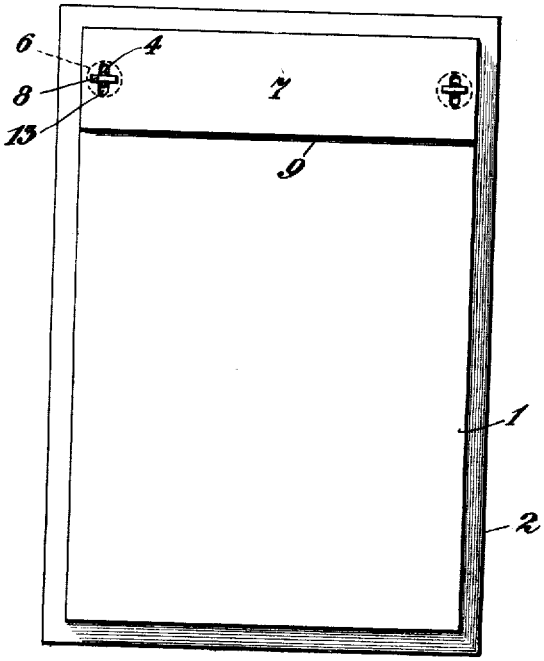
Fig. 1 is a plan view of a pad holder, embodying my invention.
Figure 2:
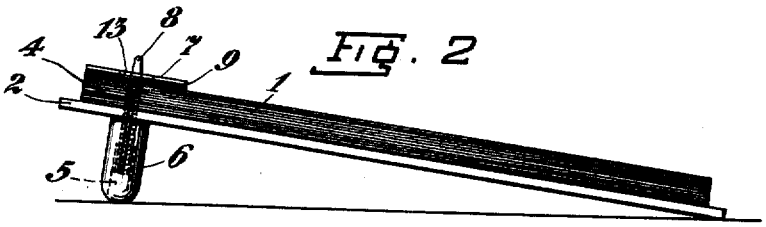
Fig. 2 is a side elevation, partly in section, of the pad in position on a desk.
Figure 3:
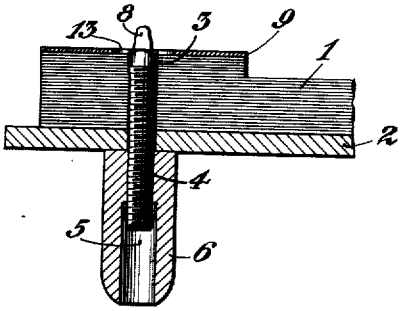
Fig. 3 is an enlarged detail, partly in section, illustrating the pad holding means.
Figure 4:
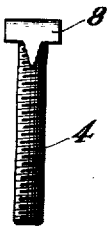
Fig. 4 is an enlarged view of the binding screw for holding the pad in position.
Figure 5:
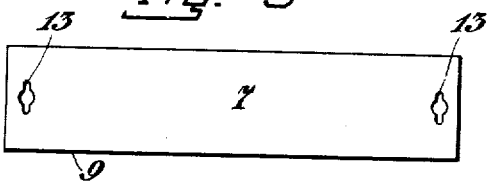
Fig. 5 is a plan view of the combined top plate and cutting device.
Figure 6:
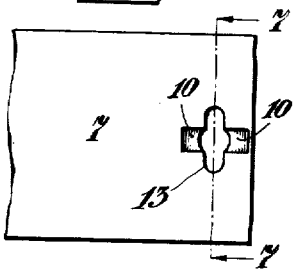
Fig. 6 is a detail section of the top plate with a modified form of locking groove.
Figure 8:
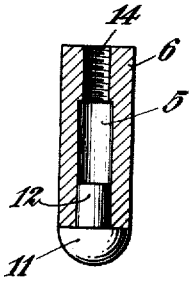
Fig. 8 is a sectional view of a standard, illustrated in Fig. 1, with a modified bottom support.
Figure 7:
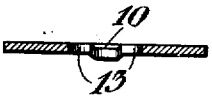
Fig. 7 is a sectional view taken on line 7—7 of Fig. 6.

In the drawings, 1 represents a pad, which, for the purpose of illustration is a calendar pad, said pad resting upon a base 2. The pad is provided with perforations 3 for the reception of a binding screw 4, which enters a socket 5 in a standard 6, said socket being provided with corresponding internal screw threads 14 for engaging with the external screw threads of the screw 4. On top of the pad 1 is set a plate 7 which is provided with openings 13, corresponding with the perforations 3 in the pad 1. When the binding screw 4 is inserted through the opening 13 in the plate and the opening 3 in the pad and inserted into the socket 5 of the binding post 6 and properly adjusted, the head 8 of said screw then holds the plate, pad and standard together and the pad is firmly held on the base, the said base being then inclined, as clearly illustrated in Fig. 2. The plate 7 performs another function in that the edge 9 acts as a cutting edge for the purpose of cleanly severing the leaves of the pad when desired. In the modification shown in Fig. 6, the plate 7 is provided with depressed or recessed portions 10—10 into which the head 8 of the screw bolt 4 will fit and be securely held in position and prevent it from rotating. In Fig. 8, I have illustrated the standard 6 as provided with a semi-spherical member 11, having a projection 12 entering the socket 5 in said standard. The member 11 is made of a material which will give the device a firm support and frictional contact with the desk and prevent it from moving or slipping when the person is writing on the pad. I have found that in the pads as heretofore constructed, in which there was a perforation for the purpose of severing the leaves when desired, a ragged edge was invariably presented after several leaves had been torn off, but by utilizing the top-plate as a cutting device, I find that the leaves are cleanly severed, and no ragged edge is presented.

A device as herein described makes a very simple, compact, inexpensive and attractive article and in which it is easy to remove and replace the leaves of the pad when desired and by reason of its angular position on the desk, makes it readily and easily adapted for writing thereon.

The top plate 7 is admirably adapted for advertising purposes, and if desired, any manner of advertising may be engraved, cut, stamped, or otherwise placed thereon.

In accordance with the provisions of the patent statute, I have described the principle of my invention, together with the device which I now consider to represent a practical embodiment thereof, but I desire it understood that my invention is not confined to the particular form of device herein shown and described, the same being merely illustrative, and that the invention can be carried out in other ways without departing from the spirit of my invention, and, therefore, I claim broadly the right to employ all equivalent instrumentalities coming within the scope of the appended claims, and by means of which the objects of my invention are attained, and the new results accomplished, as herein set forth, as it is obvious that the particular embodiments herein shown and described are only some of many that can be employed to attain these objects and accomplish these results.

Having described my invention, what I claim and desire to secure by Letters Patent is:

1. In a device of the character described, a base, a pad positioned on said base, a perforation through said pad adjacent one end thereof, a corresponding perforation in said base, a bolt passing through the perforations of the base and the pad and retaining means on the ends of the bolt below the base and providing securing means for the pad, and supporting means for the base.

2. In a device of the character described, a base, a pad positioned on said base, spaced-apart perforations adjacent one end of said pad, corresponding perforations in said base, bolts passing through the perforations of the base and the pad, and adjustable retaining means on the ends of the bolts below the base and providing securing means for the pad, and supporting means for the base.

3. In a device of the character described, a base, a pad positioned on said base, said pad provided with spaced-apart perforations adjacent one end thereof, corresponding perforations in the base, bolts passing through the perforations of the base and the pad and socketed retaining means threaded to the bolt below said base and providing securing means for the pad and supporting means for the base.

4. In a device of the character described, a base, a pad positioned on said base, a tear-off plate positioned on said pad adjacent one end thereof, said base, pad and plate being provided with alined perforations, those in the plate being slotted, bolts passing through said perforations to secure the base, pad and plate together, turn buttons on said bolts adapted to pass through the slots in said plate whereby the plate may be released from the bolts and retaining means on the ends of the bolts below said base.

5. In a device of the character described, a base, a pad positioned on said base, a tear-off plate positioned on said pad adjacent one end thereof, said base, pad and plate being provided with alined perforations, those in the plate being slotted, bolts passing through said perforations to secure the base, pad and plate together, turn buttons on said bolts adapted to pass through the slots in said plate whereby said plate is releasably secured to said bolts, and socketed retaining means threaded to said bolts below said base and providing securing means for said pad and supporting means for said base.

6. In a device of the character described, a base, a pad positioned on said base, a tear-off plate positioned on said pad adjacent one edge thereof, said base, pad and plate being provided with alined perforations, those in the plate being slotted, bolts passing through said perforations to secure the base, pad and plate together, turn buttons on said bolts adapted to pass through the slots on said plate whereby said plate is releasably secured to said bolts and threaded compression members traveling on said bolts below said base and locking said base, pad and plate against relative movement.

7. In a device of the character described, a base, a pad positioned on said base, a pair of upstanding bolts projecting above said base and passing through said pad adjacent one end thereof and a tear-off plate positioned on said pad, and means for detachably securing said plate to said bolts, said means comprising turn buttons on said bolts projecting through slots in said plate.

8. In a device of the character described, in combination, a group of superposed members and a plurality of interlocking members adjacent one edge thereof for maintaining said group of superposed members in superposed relation and angularly with reference to a supporting surface.

9. In a device of the character described, a base, a pad positioned on said base, said pad having spaced-apart perforations adjacent one end thereof, corresponding perforations in the base, bolts passing through the perforations of the base and the pad and socketed retaining legs threaded to the bolt below said base and providing securing means for the pad and supporting means for the base, said legs supporting the device in an inclined position.

10. In a device of the character described, a base, a pad positioned on said base, said pad having spaced-apart perforations adjacent one end thereof, corresponding perforations in said base, bolts passing through the perforations of the base and the pad, and adjustable socketed retaining legs on the ends of the bolts below the base and providing securing means for the pad, and supporting means for the base, said legs being provided at the lower end with a member made of a material which will give the device a firm support and frictional contact with the support and prevent it from moving or slipping when being written upon.

This specification signed this 14th day of March, 1927.

JOHN B. KEMP.

DISCLAIMER

Reissue No. 16,618.—*John B. Kemp*, Ridgewood, N. J. PAD HOLDER. Patent dated May 10, 1927. Disclaimer filed April 4, 1931, by the assignee, *Clark Loose Leaf Manufacturing Company.*

Hereby enters this disclaimer to that part of the claim in said specification which appears as claim 8 and is in the following words, to wit:

"8. In a device of the character described, in combination, a group of superposed members and a plurality of interlocking members adjacent one edge thereof for maintaining said group of superposed members in superposed-relation and angularly with reference to a supporting surface."

[*Official Gazette April 21, 1931.*]